United States Patent
Juni

(10) Patent No.: US 9,684,179 B2
(45) Date of Patent: Jun. 20, 2017

(54) PRESENTATION DEVICE INCLUDING A PLATE

(71) Applicant: NITTO DENKO CORPORATION, Ibaraki-shi, Osaka (JP)

(72) Inventor: Noriyuki Juni, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 60 days.

(21) Appl. No.: 14/442,030

(22) PCT Filed: Nov. 12, 2013

(86) PCT No.: PCT/JP2013/080487
§ 371 (c)(1),
(2) Date: May 11, 2015

(87) PCT Pub. No.: WO2014/084034
PCT Pub. Date: Jun. 5, 2014

(65) Prior Publication Data
US 2015/0301347 A1    Oct. 22, 2015

(30) Foreign Application Priority Data
Nov. 27, 2012   (JP) .................... 2012-259047

(51) Int. Cl.
*G03B 21/28* (2006.01)
*G02B 27/22* (2006.01)
(Continued)

(52) U.S. Cl.
CPC ........... *G02B 27/2292* (2013.01); *G02B 5/09* (2013.01); *G02B 27/0101* (2013.01);
(Continued)

(58) Field of Classification Search
CPC .............. G02B 27/0101; G02B 27/026; G02B 27/2221; G02B 27/2292; G02B 5/09;
(Continued)

(56) References Cited

U.S. PATENT DOCUMENTS

| | | | |
|---|---|---|---|
| 2009/0237803 A1* | 9/2009 | Hotta | G02B 3/005 359/630 |
| 2010/0066978 A1* | 3/2010 | Powell | G03B 21/28 353/10 |

(Continued)

FOREIGN PATENT DOCUMENTS

| | | |
|---|---|---|
| JP | 2001-215444 A | 8/2001 |
| JP | 2003-98479 A | 4/2003 |

(Continued)

OTHER PUBLICATIONS

Notification of Transmittal of Translation of the International Preliminary Report on Patentability (Form PCT/IB/338) of Application No. PCT/JP2013/080487 mailed Jun. 11, 2015 with Forms PCT/IB/373, and PCT/ISA/237 (English translation) (8 pages).

(Continued)

*Primary Examiner* — Sultan Chowdhury
*Assistant Examiner* — Magda Cruz
(74) *Attorney, Agent, or Firm* — Westerman, Hattori, Daniels & Adrian, LLP

(57) ABSTRACT

A presentation device according to the present invention includes a panel-shaped image-forming optical element and a flat panel display, and forms a video picture (image) appearing on the display as a spatial image in space over the image-forming optical element. Between the upper surface of the image-forming optical element and the spatial image, a plate (guide plate) having an opening corresponding to the planar shape of the image-forming optical element is disposed at an attitude inclined upwardly from the front toward (Continued)

the back side with respect to the image-forming optical element, whereby the spatial image floats up through the opening of the guide plate. This allows anyone to view a three-dimensional spatial image rich in a sense of depth without experience and skill automatically in an appropriate direction from an appropriate position.

2 Claims, 5 Drawing Sheets

(51) Int. Cl.
  *H04N 13/04*    (2006.01)
  *G02B 27/01*    (2006.01)
  *G02B 5/09*     (2006.01)
  *G02B 27/02*    (2006.01)
  *G02B 26/08*    (2006.01)

(52) U.S. Cl.
  CPC ....... *G02B 27/026* (2013.01); *G02B 27/2221* (2013.01); *G03B 21/28* (2013.01); *H04N 13/04* (2013.01); *G02B 26/0833* (2013.01); *G02B 2027/0123* (2013.01); *G02B 2027/0127* (2013.01)

(58) Field of Classification Search
  CPC .... G02B 2027/0123; G02B 2027/0127; G02B 26/0833; G03B 21/28; H04N 13/04
  See application file for complete search history.

(56) References Cited

U.S. PATENT DOCUMENTS

| | | |
|---|---|---|
| 2010/0231860 A1 | 9/2010 | Maekawa |
| 2011/0074657 A1 | 3/2011 | Sugiyama |
| 2011/0075267 A1 | 3/2011 | Sugiyama |
| 2012/0268640 A1* | 10/2012 | Shimatani ................ G02B 5/04 348/333.1 |

FOREIGN PATENT DOCUMENTS

| | | |
|---|---|---|
| JP | 2011-70073 A | 4/2011 |
| JP | 2011-70074 A | 4/2011 |
| WO | 2007/116639 A1 | 10/2007 |
| WO | 2012/161073 A1 | 11/2012 |

OTHER PUBLICATIONS

International Search Report dated Dec. 10, 2013 issued in corresponding application No. PCT/JP2013/080487.

* cited by examiner

RELATED ART

US 9,684,179 B2

PRESENTATION DEVICE INCLUDING A PLATE

TECHNICAL FIELD

The present invention relates to a presentation device which projects a two-dimensional image such as a photograph in a manner floating up in space to thereby three-dimensionally display a video picture with a sense of depth.

BACKGROUND ART

An "image display device" employing a planar image-forming optical element (microlens array) has been proposed as a means for displaying a two-dimensional image such as a photograph as a pseudo-three-dimensional image in a manner floating up in space by means of a relatively simple configuration (with reference to Patent Literature 1 and the like, for example).

This image display device is provided with a pair of microlens arrays (image-forming optical element) positioned in a parallel spaced-apart relation to an image display surface such as an LCD and including a plurality of convex lenses (unit optical elements) disposed adjacent to each other in a matrix on opposite surfaces. Using the image-forming function of the microlens arrays, the image display device is adapted to form an erect image of unity magnification corresponding to the aforementioned two-dimensional image in a space opposite from the aforementioned image display surface (in a position opposite from the image display surface with respect to an element surface of the aforementioned image-forming optical element).

However, the aforementioned formed image (spatial image) is projected directly in front of the microlens arrays in the aforementioned image display device. For appropriate viewing of this spatial image, it is necessary to arrange a viewer, the microlens arrays and the image display surface in a straight line. This results in a problem such that a viewable viewing angle is narrow. Also, the aforementioned image display device, which requires large space on a rear side as viewed from the viewer, is low in flexibility of installation, and imposes on the viewer such an inconvenience that the viewer must look into the arrays from a specific position in front of the aforementioned microlens arrays to view the image.

On the other hand, the present applicant proposes a display device which comprises a flat panel display such as an LCD, and a planar image-forming optical element (a micromirror array, with reference to Patent Literature 2) including a multiplicity of recessed unit optical elements or protruding unit optical elements arranged in an array and each having two mirror surfaces (corner reflectors) orthogonal to each other in Japanese Patent Application No. 2012-81248 and in Japanese Patent Application No. 2012-185198. As shown in FIG. 8, this display device is configured such that the flat panel display D is disposed on one surface side of (under) the image-forming optical element, with a display surface Da of the flat panel display D inclined at a predetermined angle α (not less than 30° and less than 90°) with respect to an element surface P of the aforementioned image-forming optical element (micromirror array M). Thus, the aforementioned display device is capable of sharply displaying a spatial image standing up obliquely toward the front side (viewer side) in space over the device in a manner floating up from the upper surface of the aforementioned image-forming optical element. Also, this display device has characteristics of being able to be configured as a compact device, being high in flexibility of arrangement, and being excellent in portability.

RELATED ART DOCUMENTS

Patent Document

PTL 1: JP-A-2003-98479
PTL 2: International Publication No. WO2007/116639

SUMMARY

The aforementioned display device has a wider viewable viewing angle and a wider range of an appropriate viewing position than the aforementioned conventional "image display device". It has, however, been found that the aforementioned display device does not have a comparable object around the displayed spatial image, so that a sense of distance of viewer's eyes (depth of field) does not coincide with an actual distance. This makes it difficult to provide binocular parallax, so that it is difficult for a viewer to feel a three-dimensional effect, a sense of floating, a sense of realism and the like when viewing the spatial image.

In the course of an experiment for judging the ease of viewing of the aforementioned spatial image by invited test subjects, it has been found to be difficult for those unskilled in this kind of three-dimensional display device (viewing device) to know the height (direction and angle) at which they look at the display device and the position of the display device at which the focus of their eyes is to be adjusted, so that they cannot intuitively manipulate (view) the display device in some cases. Solving these problems allows a greater number of people to use the aforementioned display device more conveniently.

In view of the foregoing, it is therefore an object of the present invention to provide a presentation device which allows anyone to view a two-dimensional image floating up in space separated from an image-forming optical element as a three-dimensional spatial image rich in a sense of depth without experience and skill automatically in an appropriate direction from an appropriate position.

To accomplish the aforementioned object, a presentation device according to the present invention comprises: a panel-shaped image-forming optical element; a flat panel display; and a plate, wherein a spatial image, which corresponds to an image appearing on the flat panel display disposed on one surface side of the image-forming optical element, is formed standing up obliquely in space on the other surface side of the image-forming optical element due to an image-forming function of the image-forming optical element and, wherein the plate has an opening corresponding to the planar shape of the image-forming optical element and is provided between the other surface of the image-forming optical element and the spatial image, the plate being disposed at an attitude inclined upwardly from the front toward the back side with respect to the image-forming optical element, whereby the spatial image passes through the opening of the plate and stands up obliquely in space on the other surface side of the image-forming optical element.

The present inventor has made studies to solve the aforementioned problem. As a result, the present inventor has found that the insertion of the plate in the form of a frame which serves as a background of the spatial image between the other surface (upper surface on the viewer side) of the panel-shaped image-forming optical element and the spatial image formed over the image-forming optical element causes binocular parallax between the background (plate)

and the spatial image, to thereby allow a viewer to feel the spatial image more three-dimensionally.

At the same time, the aforementioned plate hides part of the upper surface of the aforementioned image-forming optical element, whereby the viewer gently controls (corrects) the direction in which the viewer looks down (looks into) the image-forming optical element and a positional relationship with his/her head (eyes). Thus, the present inventor has found that this plate automatically guides the viewing direction of the viewer to the direction and position optimum for the viewing of the spatial image. Hence, the present inventor has attained the present invention.

In the presentation device according to the present invention, the plate having the opening corresponding to the planar shape of the image-forming optical element is provided between the other surface of the aforementioned panel-shaped image-forming optical element on the viewer side and the spatial image formed by the image-forming optical element and standing up obliquely, and is disposed at an attitude inclined upwardly from the front toward the back side. The aforementioned spatial image passes through the opening of the plate and stands up obliquely in space on the other surface side of the image-forming optical element That is, in the aforementioned presentation device, the plate in the form of a frame which serves as a "background" of the aforementioned spatial image is provided between the other surface of the aforementioned image-forming optical element and the aforementioned spatial image and is disposed at an attitude inclined in the same direction as the aforementioned spatial image. The aforementioned spatial image is formed through the opening of the plate in the form of the frame over the plate.

Thus, a comparable object (the upper surface of the plate, the edge of the opening and the like) for recognition of parallax from the spatial image is present near (around) the formed spatial image in the aforementioned presentation device. Thus, the presentation device according to the present invention allows a viewer to feel the three-dimensional effect (depth), the sense of floating, the sense of realism and the like of the spatial image more easily than the conventional presentation device having no plate around the aforementioned spatial image (with reference to FIG. 8).

In a bright ambient environment, when a viewer looks into the spatial image in the direction of the front (the front of the inclined opening) of the aforementioned device, a dark part (shadow) is formed between the aforementioned plate and the upper surface (the other surface) of the image-forming optical element to serve as a background of the spatial image, thereby enhancing contrast in the spatial image (video picture). This allows the viewer to feel the three-dimensional effect (depth), the sense of floating, the sense of realism and the like of the spatial image more strongly.

In the presentation device according to the present invention, unless the viewer looks into the spatial image in a direction and position appropriate for the viewing of the aforementioned spatial image (the front of the opening of the inclined plate), the aforementioned plate hides part of the upper surface of the image-forming optical element and the like unnaturally (unevenly) to give a feeling of strangeness to the viewer. Thus, the viewer who uses (views) this presentation device rotates the presentation device to an appropriate position and angle, for example, by lifting the presentation device or moves himself/herself to the front position facing the aforementioned opening, thereby unconsciously moving his/her eyepoint to a direction and position where the viewer can view the upper surface of the image-forming optical element equally on both sides through the opening of the aforementioned plate without difficulty.

Thus, the presentation device according to the present invention allows anyone to easily find the direction and position suitable for viewing where the viewer feels the three-dimensional effect of the aforementioned spatial image. Further, the viewing direction and position are the position where the viewer can feel the three-dimensional effect, the sense of floating, the sense of realism and the like of the spatial image strongest in the aforementioned presentation device. Therefore, the presentation device allows a person unskilled in this kind of three-dimensional presentation device (viewing device) to easily visually recognize and view a two-dimensional image floating up in space over the image-forming optical element as a three-dimensional spatial image rich in a sense of depth.

Preferably, the presentation device according to the present invention wherein the panel-shaped image-forming optical element is a micromirror array is capable of projecting (forming) a sharp video picture without distortion in the spatial image.

The term "front" in the presentation device according to the present invention corresponds to the position of the front end of the device in the case where a viewer views the device from the front facing the inclination of the spatial image standing up obliquely, and the term "front side" refers to a horizontal component of a direction from this device toward the eyepoint position of the viewer. On the other hand, the term "back" corresponds to the position of the rear end of the device in the case where a viewer views the device from the rear side of the inclination of the spatial image standing up obliquely, and the term "back side" refers to a horizontal component of a direction from the front end of the device toward the rear end, that is, a direction (direction of a line of sight) in which the aforementioned device is viewed from the viewer. Also, the shape "corresponding to the planar shape of an image-forming optical element" not only means that the shape exactly coincides with the planar shape but also includes a certain amount of difference in size.

DESCRIPTION OF EMBODIMENTS

Next, embodiments according to the present invention will now be described in detail with reference to the drawings. It should be noted that the present invention is not limited to the embodiments.

Figure 1:
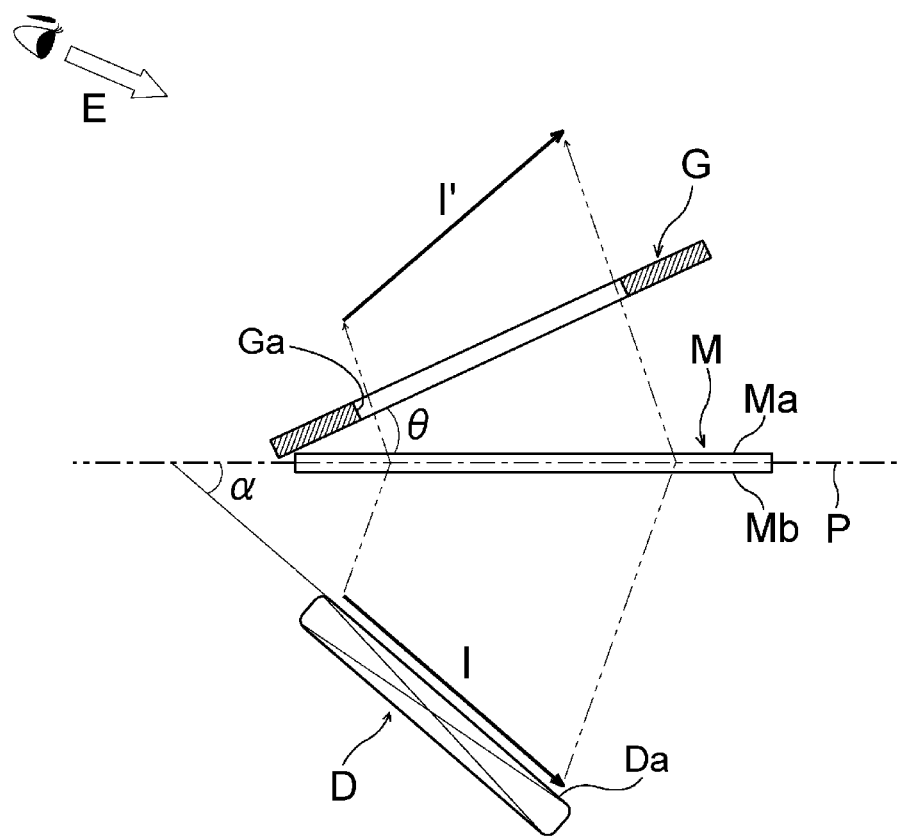
FIG. 1 is a partial sectional view illustrating a basic configuration of a presentation device according to an embodiment of the present invention.
Figure 2:
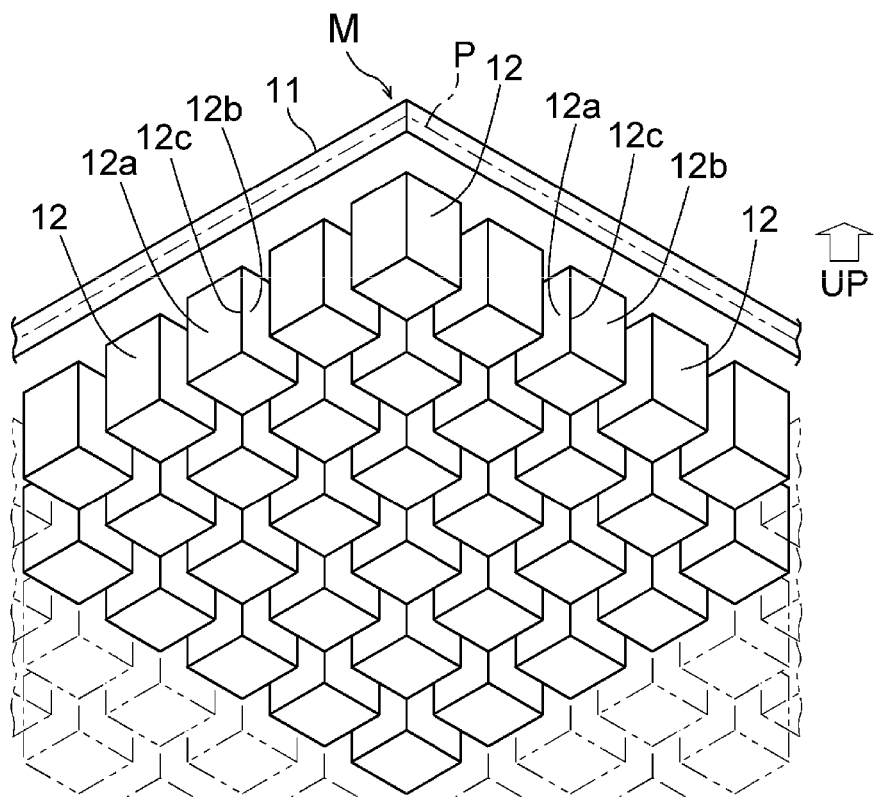
FIG. 2 is a view illustrating a structure of a micromirror array for use in the presentation device.
Figure 3:
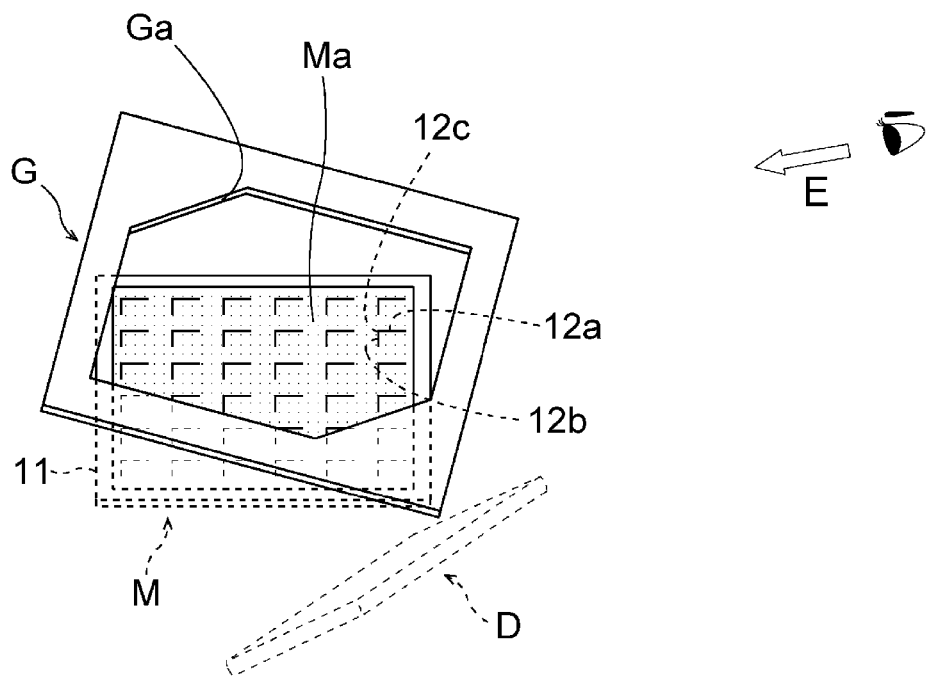
FIG. 3 is a perspective view illustrating a basic configuration of the presentation device.

FIGS. 1 and 3 are views illustrating a basic configuration of a presentation device according to the present invention. FIG. 2 is a view illustrating a detailed structure of a micromirror array M for use in the aforementioned presentation device. For the purpose of briefly illustrating only the principle of the present invention, members such as a case and a housing, and parts such as interconnect lines and electrical components are not shown in FIGS. 1 and 3. In the present example, a liquid crystal display screen (LCD) for a cellular mobile phone (smartphone or the like) is used for a flat panel display (D). The thicknesses of an image I displayed on a display surface Da of the flat panel display D and a spatial image I' projected in space (both indicated by thick arrows in FIG. 1) are shown in exaggeration.

As shown in FIG. 1, the presentation device in the present embodiment includes a panel-shaped micromirror array image-forming optical element (referred to hereinafter as a micromirror array M), and a flat panel display (referred to hereinafter as a display D). By using the reflection of light from a large number of micromirrors (corner reflectors) provided on the micromirror array M, the presentation device forms a video picture (image I) appearing on the display D disposed on one surface (in the figure, lower surface) side of the micromirror array M as a spatial image I' standing up obliquely in space on the other surface (in the figure, upper surface) side of the micromirror array M in a manner floating up.

In this presentation device, the aforementioned display D is disposed at such an attitude that the display surface Da of the display D is inclined at a predetermined angle $\alpha$ with respect to a lower surface Mb of the micromirror array M. Between an upper surface Ma of the micromirror array M and the spatial image I', a viewing direction guiding plate (referred to hereinafter as a guide plate G) having an opening Ga corresponding to the planar shape of the micromirror array M is disposed at an attitude inclined upwardly, from the front toward the back side, at a predetermined angle $\theta$ with respect to the upper surface Ma of the micromirror array M. Light reflected from the aforementioned micromirrors (corner reflectors) pass through the opening Ga of the guide plate G to form an image as the spatial image I'. This is a characteristic of the presentation device according to the present invention.

The aforementioned presentation device will be described in detail. Examples of the image-forming optical element for use in this presentation device include: refraction type image-forming elements such as various lenses including Fresnel lenses and the like, micromirrors of afocal optical systems, and corner reflectors; and erect unity-magnification type image-forming elements such as microlens arrays. Of these, the micromirror array M (protruding corner reflector array) which forms an image at a position symmetrical thereto with respect to the plane of the element surface P, as shown in FIG. 2, is preferably used in the present embodiment. This micromirror array M is disposed substantially horizontally with respect to the eyepoint (sense) of a viewer by a fixing member and the like (not shown).

The aforementioned micromirror array (corner reflector array) M will be described in further detail. As shown in FIG. 2, this micromirror array M includes a multiplicity of downwardly protruding minute unit optical elements 12 (corner reflectors) in the shape of quadrangular prisms which are provided on the lower surface (the lower surface Mb side as seen in FIG. 1) of a substrate (base) 11 and arranged in a diagonal checkerboard pattern [FIG. 2 is a view of the array as seen in an upward direction from below].

Each of the unit optical elements 12 in the shape of quadrangular prisms in the aforementioned micromirror array M has a pair of light reflecting surfaces (a first side surface 12a and a second side surface 12b on the lateral sides of the quadrangular prism) constituting a corner reflector. Each of the light reflecting surfaces is of a rectangular shape having the "ratio of the length (height h) as measured in the direction of the thickness of the substrate to the width (width w) as measured in the direction of the surface of the substrate" [aspect ratio (h/w)] of not less than 1.5. The pair of light reflecting surfaces (the first side surface 12a and the second side surface 12b) which form a corner 12c of each of the unit optical elements 12 are designed to face toward the eyepoint of the viewer (E side in FIGS. 1 and 3). As shown in FIG. 3, the unit optical elements 12 are disposed, with the outer edges thereof rotated 45° with respect to the front of the viewer (the direction E).

As shown in FIG. 1, the flat panel display (display D) which displays the image I is disposed so as to be inclined downwardly from the front side (front E side) of the viewer toward the back side at a predetermined inclination angle $\alpha$ with respect to the lower surface Mb of the aforementioned micromirror array M, so that the spatial image I' projected through the aforementioned micromirror array M faces toward the viewer.

Examples of the display D for use in displaying the aforementioned image I may include display panels capable of reproducing "white" as balanced as possible over all visible wavelengths and "black" when in a non-display state with good contrast, such as plasma display panels and organic EL display panels, in addition to liquid crystal display panels (LCDs) with backlights. The display D may be a display part for a cellular mobile phone, a personal digital assistant or the like. Specifically, normally exposed (uncovered) type display parts of smartphones, tablet PCs, digital photo frames, portable game machines, portable book readers, PDAs, electronic dictionaries and the like in which the dimensions of the display surface Da thereof correspond to the size (planar shape) of the aforementioned micromirror array M may be used as the aforementioned display D.

The inclination angle $\alpha$ of the aforementioned display D is not less than 30° and less than 90° ($30° \leq \alpha < 90°$) in consideration of the attitude, distance and the like of the viewer that uses this presentation device.

Next, the viewing direction guiding plate (guide plate G) disposed between the aforementioned micromirror array M and the spatial image I' is planar in shape as a whole. The opening Ga corresponding to the planar shape of the aforementioned micromirror array M is provided substantially in the center of the guide plate G, as shown in FIG. 3. Examples of the shape of the opening Ga may be other polygonal shapes such as triangular and pentagonal shapes, in addition to a hexagonal shape as shown in FIG. 3, or simple circular and elliptic shapes. The inner edge shape of the opening Ga may be any opening shape which is close to the planar shape of the aforementioned micromirror array M.

The aforementioned guide plate G is disposed at an attitude inclined in the same direction as the aforementioned spatial image I', i.e., inclined upwardly from the front side toward the back with respect to the micromirror array M, as seen from the viewer. The direction of inclination of the aforementioned guide plate G is a direction which provides a mirror image of the display D with respect to the aforementioned micromirror array M, as shown in FIG. 1, as seen with reference to the display D (inclination angle $\alpha$) which displays the image I. That is, the guide plate G is inclined in the same direction as the projected spatial image I', and is disposed so as to be inclined in a direction of inclination such that it is low in height on the front side of the viewer and increases in height away from the viewer toward the back side.

The inclination angle θ of the aforementioned guide plate G with respect to the upper surface Ma of the micromirror array M is set at an angle not greater than the inclination angle α of the aforementioned display D with respect to the micromirror array M. A relationship expressed by 0<θ≤α (where 30°≤α<90°)

holds between the inclination angle α and the inclination angle θ.

It is sufficient for the aforementioned guide plate G to have a minimum shape and size (size of the outer edges of a frame) such that part of the outer edge of the micromirror array M is hidden behind the guide plate G as seen from the viewer. It is, however, necessary that the guide plate G covers a somewhat wide range including the upper part of the edge portion of the aforementioned micromirror array M for the purpose of guiding the position of viewer's line of sight or head (eyes) to a proper position in front of the opening Ga with reliability, as mentioned above. Specifically, the size and shape of the guide plate G are determined as appropriate in accordance with the shape of the upper surface of a case, a housing or the like of the presentation device to be described later in consideration for design, balance and the like. Preferably, the color of the upper surface of the planar part of the guide plate G except the opening Ga (background of the spatial image I') is a dark color such as black and gray or a lusterless matte color so as not to hinder the viewing of the spatial image I'. Patterns, recesses, protrusions and the like may be made on the surface of the aforementioned planar part so long as they do not hinder the viewing of the aforementioned spatial image I'.

According to the configuration of the presentation device of the aforementioned embodiment, a comparable object (guide plate G) which causes parallax from the spatial image I' is present near (around) the spatial image I' standing up obliquely. Thus, the aforementioned presentation device improves the three-dimensional effect, the sense of floating, the sense of realism and the like of the spatial image I', as compared with presentation devices which have no object around the aforementioned spatial image. Further, a dark part (shadow) is formed (in a gap) between the aforementioned guide plate G and the micromirror array M to become a background of the spatial image I', thereby enhancing contrast in video pictures, images and the like. This allows the viewer to feel the depth, the sense of floating, the sense of realism and the like of the spatial image I' more strongly.

Next, a more specific embodiment (first embodiment) will be described.

Figure 4:
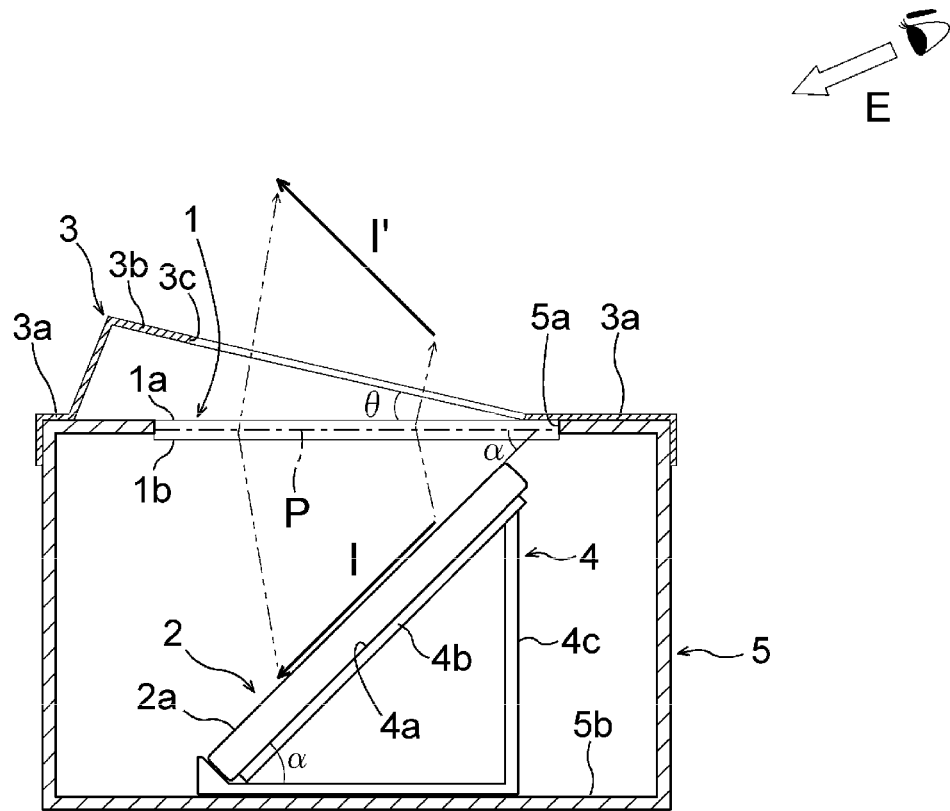
FIG. 4 is a partial sectional view showing a configuration of the presentation device according to a first embodiment.
Figure 5:
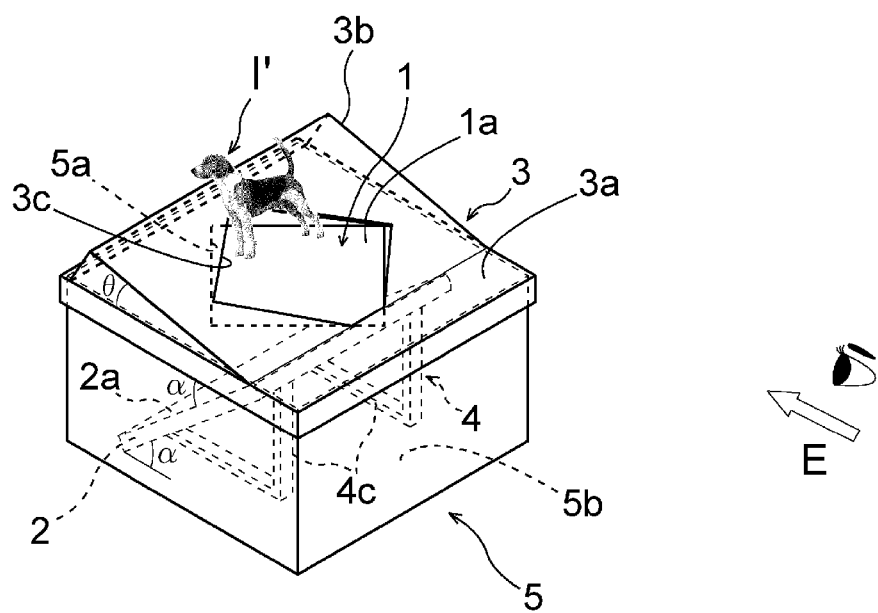
FIG. 5 is an external perspective view of the presentation device according to the first embodiment.

FIG. 4 is a partial sectional view showing the configuration of the presentation device according to a first embodiment of the present invention. FIG. 5 is an external perspective view of the presentation device according to the first embodiment.

The presentation device in the first embodiment also includes a panel-shaped micromirror array image-forming optical element (micromirror array 1), and a flat panel display (display 2). By using the reflection of light from a large number of micromirrors (corner reflectors) provided in the micromirror array 1, the presentation device according to the first embodiment forms a video picture (image I) appearing on the display 2 disposed on one surface (in the figure, lower surface 1b) side of the micromirror array 1 as a spatial image I' standing up obliquely in space on the other surface (in the figure, upper surface 1a) side of the micromirror array 1 in a manner floating up in space. In this presentation device, the aforementioned display 2 is disposed on a mounting stand 4 at such an attitude that a display surface 2a of the display 2 is inclined at a predetermined angle α with respect to the lower surface 1b of the micromirror array 1. Between the upper surface 1a of the aforementioned micromirror array 1 and the spatial image I', a viewing direction guiding plate (guide plate 3) having flat portions 3a and a sloping portion 3b is disposed at an attitude inclined upwardly from the front toward the back side at a predetermined angle θ with respect to the upper surface 1a of the micromirror array 1.

The aforementioned presentation device is obtained by embodying the presentation device shown in FIG. 1. More specifically, the mounting stand 4 including a mounting surface 4a for placing the display 2 thereon includes a plate-like member 4b functioning also as the aforementioned mounting surface 4a, and bases 4c, and is disposed inside a box-like case 5. As shown in FIG. 4, the aforementioned plate-like member 4b is supported by the aforementioned bases 4c at an attitude inclined at the predetermined angle α with respect to a bottom surface 5b of the case 5 and the lower surface 1b of the micromirror array 1 (or the element surface P). The upper surface of the plate-like member 4b serves as the mounting surface 4a for the display 2. A smartphone or the like is placed as the display 2 on the mounting surface 4a of the mounting stand 4, so that the display surface 2a of the aforementioned display 2 is held at an attitude inclined at α degrees with respect to the element surface P of the micromirror array 1. It should be noted that the inclination angle α of the aforementioned mounting surface 4a inside the case 5 with respect to the lower surface 1b of the micromirror array 1 (element surface P) is adjusted so that the micromirror array 1 achieves optimum image formation, and is generally not less than 30° and less than 90°, and preferably in the range of 40° to 80°.

A smartphone or the like is placed on the aforementioned mounting stand 4 either by lifting the upper part of the case 5 to open the upper surface thereof or through an insertion opening (not shown) provided on a side surface of the case 5. When a plurality of types of flat panel displays of different sizes are used as the flat panel display (a cellular mobile phone, a smartphone or the like) to be placed on the mounting stand 4, the mounting stand 4 may be of a variable (variable in inclination angle) type, a movable type and a replaceable type. Alternatively, a plurality of mounting stands corresponding to respective displays may be installed in the case 5.

As shown in FIG. 5, the case 5 which houses the aforementioned display 2 and the mounting stand 4 has a substantially box-like shape, and includes an opening 5a provided in its upper surface. The micromirror array 1 having a substantially square shape is fitted in the opening 5a (with reference to FIG. 4). A plate (guide plate 3) in the form of a frame for guiding the viewing direction (direction of the line of sight) of the viewer is disposed over the micromirror array 1. The guide plate 3 is placed at the flat portions 3a thereof on the upper surface of the case 5.

Next, the guide plate 3 disposed between the aforementioned micromirror array 1 and the spatial image I' includes an opening 3c (having a pentagonal shape in this example) corresponding to the planar shape of the aforementioned micromirror array 1 and provided substantially in the center of the sloping portion 3b thereof, as shown in FIGS. 4 and 5. The sloping portion 3b (including the opening 3c) of the aforementioned guide plate 3 is disposed at an attitude inclined in the same direction as the aforementioned spatial image I', i.e., inclined upwardly from the front side toward the back with respect to the aforementioned micromirror array 1 as seen from the viewer, as in the aforementioned embodiment. The direction of inclination of the sloping portion 3b of the aforementioned guide plate 3 is a direction which provides a mirror image of the display 2 with respect to the aforementioned micromirror array 1, as shown in FIG. 4, as seen with reference to the display 2 (inclination angle α) which displays the image I. That is, the guide plate 3 is inclined in the same direction as the projected spatial image I', and is disposed so as to be inclined in a direction of inclination such that it is low in height on the front side of the viewer and increases in height away from the viewer toward the back side.

The inclination angle θ of the sloping portion 3b of the aforementioned guide plate 3 with respect to the upper surface 1a of the micromirror array 1 is set at an angle not greater than the inclination angle α of the aforementioned display 2 with respect to the micromirror array 1. A relationship expressed by $$0 < \theta \leq \alpha \text{ (where } 30° \leq \alpha < 90°)$$

holds between the inclination angle α and the inclination angle θ.

Examples of the shape of the opening 3c of the aforementioned guide plate 3 may be other polygonal shapes, in addition to the aforementioned pentagonal shape, or simple circular and elliptic shapes. The inner edge shape of the opening 3c may be any opening shape which is close to the planar shape of the aforementioned micromirror array 1. Also, the size (size of the outer edges of the frame) and shape of the sloping portion 3b of the aforementioned guide plate 3 may be changed as appropriate in accordance with the shape of the upper surfaces of the case 5, a housing or the like of the presentation device inconsideration for design, balance and the like. Preferably, the color of the upper surface of the sloping portion 3b except the opening 3c (background of the spatial image I') is a dark color such as black and gray or a lusterless matte color so as not to hinder the viewing of the spatial image I'. Patterns, recesses, protrusions and the like may be made on the surface of the aforementioned sloping portion 3b so long as they do not hinder the viewing of the aforementioned spatial image I'.

In the aforementioned first embodiment, the case 5 which houses the display 2 and the mounting stand 4 has a substantially cubic box-like shape (closed box-like shape), as shown in FIG. 5. However, the case 5 may have the shape of a polygonal prism or a circular cylinder.

Figure 6:
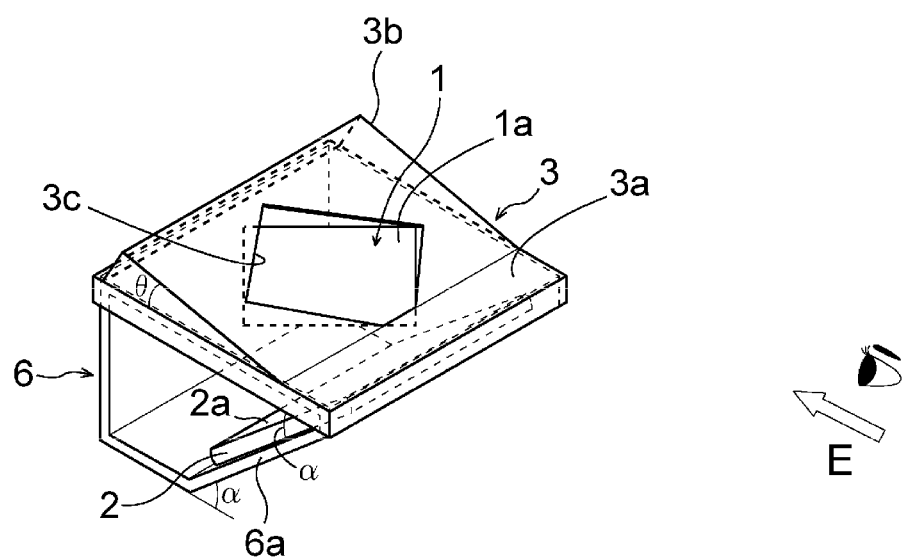
FIG. 6 is a perspective view showing another example of the configuration of the presentation device according to the present invention.

Further, this case may be an open type housing. In the case of a configuration (housing 6) having no lateral wall surfaces as shown in FIG. 6, one side surface (sloping surface 6a) of this housing 6 may be used as a mounting surface (mounting surface inclined at the predetermined angle α) for the display 2.

Figure 7:
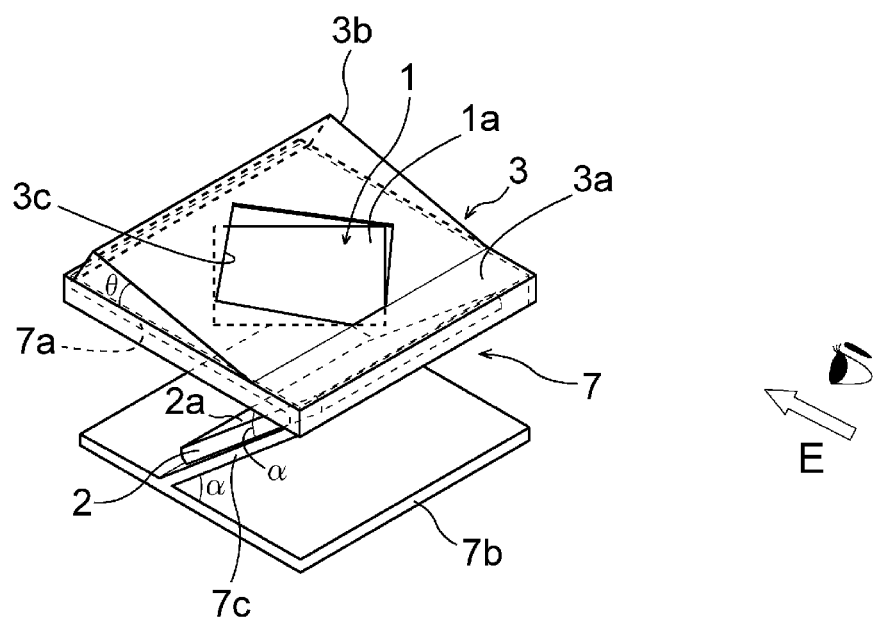
FIG. 7 is a perspective view showing still another example of the configuration of the presentation device according to the present invention.
Figure 8:
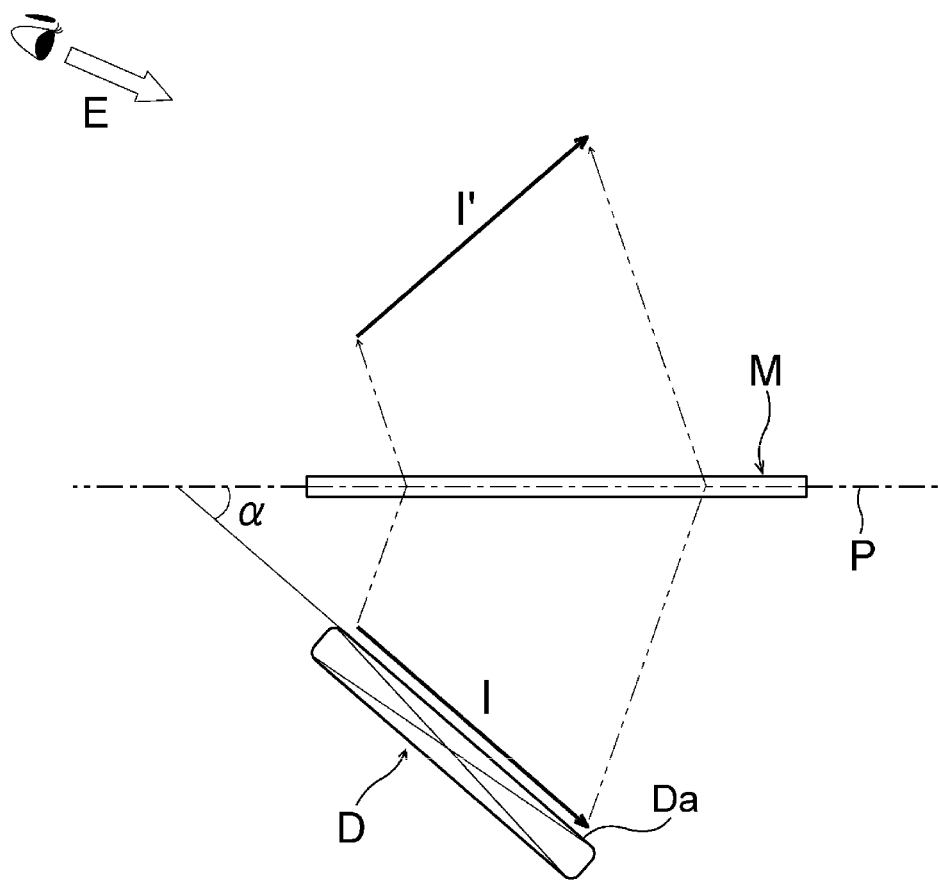
FIG. 8 is a partial sectional view illustrating a basic configuration of a conventional presentation device.

Also, this case may be of a configuration (housing 7) having no wall surfaces around the display 2 as shown in FIG. 7. In this case, a mounting plate 7c inclined at the predetermined angle α is provided between a top surface (top plate 7a) and a bottom surface (bottom plate 7b) of the housing 7, and may be used as a mounting surface for the display 2.

In the presentation device according to the first embodiment described above, the guide plate 3 positioned near (around) the spatial image I' standing up obliquely functions as a background which causes parallax from the spatial image I'. This allows the viewer to feel the three-dimensional effect, the sense of floating, the sense of realism and the like of the spatial image I'. Further, a dark part (shadow) formed (in a gap) between the aforementioned guide plate 3 and the micromirror array 1 enhances contrast in video pictures, images and the like. This similarly allows the viewer to feel the depth, the sense of floating, the sense of realism and the like of the spatial image I' more strongly.

As for the aforementioned presentation device, it is difficult in some cases for the viewer to find the direction and position appropriate for the viewing of the spatial image I', depending on the orientation of the case, the housing or the like. In such cases, the presentation device of the first embodiment is configured such that the guide plate 3 hides part of the upper surface 1a of the micromirror array 1 and the like unnaturally (unevenly) to give a feeling of strangeness to the viewer unless the viewer looks into the spatial image I' in a direction and position appropriate for the viewing of the spatial image I' (the front of the opening 3c of the inclined guide plate 3). Thus, the viewer who uses (views) this presentation device rotates the presentation device to an appropriate position and angle, for example, by lifting the presentation device or moves himself/herself to the front position facing the opening 3c, thereby unconsciously moving his/her eyepoint to a direction and position where the viewer can view the upper surface 1a of the micromirror array 1 equally on both sides through the opening 3c of the guide plate 3.

Thus, the presentation device according to the aforementioned first embodiment allows anyone to easily find the direction and position suitable for viewing where the viewer feels the three-dimensional effect of the aforementioned spatial image I'. Further, the viewing direction and position are the position where the viewer can feel the three-dimensional effect, the sense of floating, the sense of realism and the like of the spatial image I' strongest in the aforementioned presentation device. Therefore, the aforementioned presentation device allows a person unskilled in this kind of three-dimensional presentation device (viewing device) to easily visually recognize and view a two-dimensional image (spatial image I') floating up in space over the micromirror array 1 as a three-dimensional spatial image rich in a sense of depth.

EXAMPLES

Next, an evaluation test for "visual recognizability" and a "pop-up effect" (a three-dimensional effect and a sense of floating) of a spatial image I' will be described which was made using a presentation device (with reference to the aforementioned first embodiment) in which the guide plate 3 having the opening 3c corresponding to the planar shape of the micromirror array 1 was disposed on the upper surface of the case 5.

Inventive Example 1

The presentation device of the first embodiment shown in FIGS. 4 and 5 was used as a presentation device of Inventive Example 1 to be tested. An image-forming optical element (micromirror array 1, with reference to FIG. 2 for detailed structure) used herein was 60 mm square. An LCD (mounted on a smartphone) measuring 4.65 inch (approximately 11.8 cm) diagonally was used as a flat panel display (display 2). The display 2 was placed at an attitude inclined at 55° (angle α) with respect to the lower surface 1b of the micromirror array 1. The guide plate 3 on the case 5 was provided so that the sloping portion 3b including the opening 3c was inclined at 20° (angle θ) with respect to the upper surface 1a of the micromirror array 1. While the width (diagonally) of the micromirror array 1 as measured in the lateral direction of the front of the case as seen from the viewer is approximately 85 mm, the opening 3c of the guide plate 3 which covers the micromirror array 1 is 110 mm in opening width (maximum) as measured in the lateral direction of the front thereof and 60 mm in opening width (maximum) as measured in a longitudinal direction (front-to-back direction).

<Evaluation Test for "Visual Recognizability" and "Pop-Up Effect">

For the evaluation test, 10 test subjects were invited at random from those not involved in studies in this field. The evaluation test was started in such a state that the presentation device of Inventive Example 1 was left casually as it is on a table.

"Visual Recognizability"

The length of time required for each of the test subjects to handle the presentation device left casually as it is on the table and to look into and recognize a displayed spatial image was measured. A presentation device in which the guide plate 3 was not mounted was prepared as a blank (Comparative Example 1). A similar test was conducted on this presentation device. A comparison was made between the results in Inventive Example 1 and in Comparative Example 1.

<Results>

In the presentation device of Inventive Example 1 in which the guide plate 3 was mounted, all of the test subjects (10 test subjects) recognized the spatial image within 3 seconds after they handled the presentation device.

In the presentation device of Comparative Example 1 in which the guide plate 3 was not mounted, six out of the 10 test subjects were able to recognize the spatial image within 3 seconds after they handled the presentation device, but the remaining four test subjects required 5 seconds or longer to recognize the spatial image.

"Pop-Up Effect"

After the test subjects recognized the spatial images in the presentation device of Inventive Example 1 and in the presentation device of Comparative Example 1, a survey was conducted by questionnaires as to which one of the spatial images caused the test subjects to feel a more pop-up effect (three-dimensional effect and sense of floating).

<Results>

All of the 10 test subjects responded that the presentation device of Inventive Example 1 in which the guide plate 3 was mounted caused the test subjects to feel a more "pop-up effect" than the presentation device of Comparative Example 1 in which the guide plate 3 was not mounted.

It is found from the evaluation test that the presentation device according to the present invention is improved in visual recognizability of a displayed (projected) spatial image, as compared with the conventional presentation device (having no guide plate). Also, the presentation device according to the present invention allows the viewer to feel the three-dimensional effect (depth), the sense of floating, the sense of realism and the like of the spatial image more strongly.

Although specific forms in the present invention have been described in the aforementioned example, the aforementioned example should be considered as merely illustrative and not restrictive. It is contemplated that various modifications evident to those skilled in the art could be made without departing from the scope of the present invention.

The presentation device according to the present invention is capable of displaying a two-dimensional image rich in a sense of depth and appearing realistically three-dimensional in a manner floating up over the body of the device.

REFERENCE SIGNS LIST

D Display
Da Display surface
G Guide plate
Ga Opening
M Micromirror array
Ma Upper surface
Mb Lower surface
P Element surface
I Image
I' Spatial image
1 Micromirror array
1a Upper surface
1b Lower surface
2 Display
2a Display surface
3 Guide plate
3a Flat portion
3b Sloping portion
3c Opening
4 Mounting stand
4a Mounting surface
5 Case
7 Housing
11 Substrate
12 Unit optical element The invention of claimed is:

1. A presentation device comprising:
a panel-shaped image-forming optical element;
a flat panel display; and
a plate,
wherein a spatial image, which corresponds to an image appearing on the flat panel display disposed on one surface side of the image-forming optical element, is formed standing up obliquely in space on the other surface side of the image-forming optical element due to an image-forming function of the image-forming optical element, and
wherein the plate has an opening corresponding to the planar shape of the image-forming optical element and is provided between the other surface of the image-forming optical element and the spatial image, the plate being disposed at an attitude inclined upwardly from the front toward the back side with respect to the image-forming optical element, whereby the spatial image passes through the opening of the plate and stands up obliquely in space on the other surface side of the image-forming optical element.

2. The presentation device according to claim 1, wherein the panel-shaped image-forming optical element is a micromirror array.

* * * * *